United States Patent [19]

Anderson et al.

[11] Patent Number: 4,575,523

[45] Date of Patent: Mar. 11, 1986

[54] HIGH BUILD, LOW BAKE CATHODIC ELECTROCOAT

[75] Inventors: Terry L. Anderson, Rochester Hills; Tapan K. Deb Roy, Novi; Ding Y. Chung, Farmington Hills, all of Mich.

[73] Assignee: Inmont Corporation, Clifton, N.J.

[21] Appl. No.: 696,296

[22] Filed: Jan. 29, 1985

[51] Int. Cl.$^4$ .................. C25D 13/06; C09D 5/44; C09D 3/58

[52] U.S. Cl. .................. 523/414; 204/181.7; 428/418; 523/404; 523/415; 523/416; 524/901

[58] Field of Search .................. 204/181 C; 524/901; 523/414, 404, 415, 416; 428/418

[56] References Cited

U.S. PATENT DOCUMENTS

| | | | |
|---|---|---|---|
| 3,804,786 | 4/1974 | Sekmakas | 204/181 C |
| 3,922,253 | 11/1975 | Jerabek et al. | 528/45 |
| 3,984,299 | 10/1976 | Jerabek | 204/181.7 |
| 4,017,438 | 4/1977 | Jerabek et al. | 204/181 C |
| 4,031,050 | 6/1977 | Jerabek | 524/901 |
| 4,093,594 | 6/1978 | Anderson | 204/181.7 |
| 4,104,147 | 8/1978 | Marchetti et al. | 204/181 C |
| 4,134,864 | 1/1979 | Belanger | 523/414 |
| 4,137,140 | 1/1979 | Belanger | 204/181.7 |
| 4,139,510 | 2/1979 | Anderson | 204/181.7 |
| 4,182,831 | 1/1980 | Hicks | 528/103 |
| 4,182,833 | 1/1980 | Hicks | 204/181 C |
| 4,225,478 | 9/1980 | Hicks | 523/414 |
| 4,225,479 | 9/1980 | Hicks | 523/425 |
| 4,256,621 | 3/1981 | Shimokai et al. | 524/901 |
| 4,339,369 | 6/1982 | Hicks et al. | 523/414 |
| 4,419,467 | 12/1983 | Wismer et al. | 523/416 |
| 4,468,307 | 8/1984 | Wismer et al. | 204/181.7 |

Primary Examiner—Ronald W. Griffin
Attorney, Agent, or Firm—Emil Richard Skula

[57] ABSTRACT

Cathodic electrodepositable resin compositions particularly adapted for use as film forming compositions in cathodic electrodeposition processes. The resin is the reaction product of a modified epoxy formed by reacting a polyepoxide with a water soluble or water miscible polyol, an excess of polyamine, and an aliphatic monoepoxide. The resin, when combined with a cross-linking agent and solubilized in an aqueous electrodeposition bath, is capable of depositing high build coatings in a short period of time with a low cross-linking temperature in a cathodic electrodeposition process. The resin compositions are salted with an acid and used as components of aqueous cathodic electrodeposition baths.

18 Claims, No Drawings

HIGH BUILD, LOW BAKE CATHODIC ELECTROCOAT

DESCRIPTION

1. Technical Field

The field of art to which this invention pertains is epoxy resins, and, more specifically, epoxy resin compositions containing cross-linking agents for use in cathodic electrocoat processes.

2. Background Art

The use of electrodepositable resin compositions in aqueous baths to coat objects is well known in the art. Typically, a resinous composition, which has been mixed with a cross-linking composition to form an electrodepositable coating composition, is salted with an acid so that the composition is solubilized in water. The aqueous coating composition is thought to be closer to a dispersion than a true solution and is typically described as solubilized rather than dissolved. The resins typically used are epoxide resins which have been either reacted with or adducted with amines. The amine is necessary so that a nitrogen atom is available to be salted by an acid to solubilize the composition in water. Solubilization is typically done by feeding an electrodepositable resin composition into a reactor vessel containing an organic or inorganic acid and water.

The electrodeposition bath generally contains an anode, immersed in the bath, which is connected to a DC electric circuit. An article to be coated must comprise an electrically conductive material such as metal. The article is connected to the previously mentioned DC circuit and functions as the cathode. The article is dipped into the bath and the circuit is closed wherein electrons flow through the cathode to the anode, i.e. conventional current flow from the anode to the cathode. Simultaneously, positively charged particles of the electrodepositable coating composition are transported and deposited on the surfaces of the cathodic article. The film thickness of the deposited film is a function of time, current flow, conductivity, etc. and is related to the resinous composition utilized in the bath. The current flow typically diminishes as the deposited film layer increases in thickness due to the electrically insulating properties of the coating. The coated article is then removed from the bath after the desired thickness is achieved and typically baked in an oven as a curing step resulting in the cross-linking or curing of the coating composition, thereby producing a hard, corrosion resistant coating. Although there are many patents covering compositions of this type, some of the more typical patents are described below.

U.S. Pat. No. 4,031,050 discloses cationic electrodepositable compositions comprising amine-epoxy resin adducts and blocked polyisocyanates.

Cationic epoxide-amine reaction products used as electrodepositable coating resins are disclosed in U.S. Pat. No. 4,182,833. This patent also discloses the use of blocked polyisocyanate cross-linking compositions.

U.S. Pat. No. 4,104,147 discloses electrodepositable cationic chain extended polyepoxides, wherein the molecule is extended with an organic polyol, which is adducted with a secondary amine and cured with capped or blocked isocyanate derivatives.

U.S. Pat. No. 4,225,479 discloses electrodepositable resin compositions comprising the reaction product of a polyepoxide resin and a primary amine. This patent also discloses the use of cross-linking agents such as aminoplast resins, phenoplast resins and blocked polyisocyanates.

U.S. Pat. No. 4,093,594 discloses polyepoxide resins adducted with polyamines using an excess of amine. The resins are then reacted with a monoepoxide or a monocarboxylic acid, and, when reacted with an acid, form water soluble or dispersible resins useful to coat objects in cathodic electrodeposition processes.

An improved process for the preparation of cationic resins wherein polyepoxide resins are contacted with particular polyether polyols and then reacted with cationic base group formers such as an amine or an acid is disclosed in U.S. Pat. No. 4,419,467.

The cathodic electrodepositable coating compositions known in the art have several disadvantages associated with their use including inadequate film build and throwpower, high bake temperatures, and rough film surfaces.

Build is defined as film thickness. Throwpower relates to the capacity to coat areas of the cathodic article which are remote or shielded from the anode. Throwpower is defined as the rate of deposition of film relative to the position of the anode.

The coatings of the prior art typically have film thicknesses of about 0.6 mils, although certain high build films apparently produce 1.4 mils film thicknesses. Film thickness is related to corrosion resistance. In addition, the need for a primer coat may be eliminated in certain cases when using high build films. The coatings of the prior art typically require at least about $2\frac{1}{2}$ minutes to deposit as a coating and cure at temperatures of at least about 325° F. A reduction of the deposition time and baking temperature will result in cost and energy savings.

While great strides have been made in this area of electrodepositable coating compositions, there is a constant search for improvements in this technology such as high film build, high throwpower, smooth film surfaces and low cross-linking or cure temperatures.

Accordingly, what is needed in the art are aqueous cathodic electrodepositable coating compositions which produce higher film builds under existing process parameters and have lower cure temperatures.

DISCLOSURE OF INVENTION

It has been found that novel resin compositions, particularly adapted for use as film-forming compositions in cathodic electrodeposition processes, when combined with a cross-linking agent, are capable of depositing a "high" build coatings in a "short" period of time with a "low" cross-linking temperature in an electrodeposition process. The novel resin compositions of the present invention comprise the reaction product of (I) a modified epoxy resin formed by reacting a polyepoxide resin with a water miscible or water soluble polyol; (II) a polyamine in a ratio equal to at least 1.5 moles of polyamine to each epoxide equivalent; and (III) an aliphatic monoepoxide.

Another aspect of this invention is an improved aqueous cathodic electrodeposition bath comprising water, an acid solubilized amine containing epoxy resin and a cross-linking agent which is capable of depositing "high" build coating in a "short" period of time with a "low" cross-linking temperature in an electrodeposition process. The improvement comprises a novel resin composition particularly adapted for use as a film-forming composition comprising the reaction product of (I)

a modified epoxy resin formed by reacting a polyepoxide with a water miscible or water soluble polyol; (II) a polyamine in a ratio of at least 1.5 moles of polyamine to each epoxide equivalent; and, (III) an aliphatic monoepoxide.

Another aspect of the present invention is a coated article having an improved electrodeposited coating in that the coating is deposited in a "short" period of time, the coating is a "high" build coating, and the coating has a "low" cure temperature. The improved coating is the product of an electrodeposition process wherein a cross-linking agent is combined with a resin particularly adapted for use as in a film-forming composition, said composition is salted with an acid and dispersed in an aqueous bath and cathodic electrodeposited on an article, and the article is then cured, said improvement comprising the use of a resin comprising the reaction product of (I) a modified epoxy resin formed by reacting a polyepoxide with a water miscible or water soluble polyol; (II) a polyamine in a ratio equal to at least 1.5 moles of polyamine to each epoxide equivalent; and (III) an aliphatic monoepoxide.

Another aspect of this invention is an improved method of coating articles with a film forming resin composition using a cathodic electrodeposition process wherein cathodically electrodepositable amine containing epoxide resin is mixed with a cross-linking agent, the resin is then salted with acid and solubilized in an aqueous bath containing an anode, a conductive article is electrically connected to a direct current electric circuit to act as a cathode, the article is immersed in the bath, and a direct electric current is passed across the article resulting in the deposition of a film of the resin and cross-linking agent on the article, and then the coated article is removed from the bath and baked to cure the coating, the coatings deposited are "high" build, and are deposited in a "short" period of time and have a "low" cross-linking temperature. The improvement comprises the use of a cathodically electrodepositable resin composition particularly adapted for use in film forming composition in cathodic electrodeposition processes, wherein the resin comprises the reaction product of:

(I) a modified epoxy resin formed by reacting a polyepoxide with a water miscible or water soluble polyol;
(II) a polyamine in a ratio equal to at least 1.5 moles of polyamine to each epoxide equivalent; and
(III) an aliphatic monoepoxide.

Another aspect of the present invention is a method of preparing a resin composition particularly adapted for use as a film-forming composition in cathodic electrodeposition processes comprising:
(A) adducting
(I) a modified epoxy resin formed by reacting a polyepoxide with a water miscible or water soluble polyol, and
(II) a polyamine in a ratio equal to at least 1.5 moles of polyamine to each epoxide equivalent.
(B) vacuum distilling the resulting adduct to remove the unreacted polyamine; and
(C) reacting an aliphatic monoepoxide, wherein the resulting reaction product in combination with a cross-linking agent is capable of depositing "high build" coatings in a "short" period of time with a "low" cross-linking temperature in a cathodic electrodeposition process.

The foregoing, and other features and advantages of the present invention will become more apparent from the following description.

BEST MODE FOR CARRYING OUT THE INVENTION

The cathodic electrodepositable coating compositions of this invention comprise epoxy resins which are initially reacted with water miscible or water soluble polyols to generate a modified epoxy resin. The modified epoxy resin is thereby chain extended resulting in an increase in the molecular weight of the epoxy molecules.

The epoxides useful in the practice of this invention are the polyepoxides typically used in this art and comprise a resinous material containing at least one epoxy group per molecule.

A particularly useful class of polyepoxides are the glycidyl polyethers of polyhydric phenols.

Such polyepoxide resin are derived from an epihalohydrin and a dihydric phenol and have an epoxide equivalent weight of about 400 to about 4,000. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'dihydroxydiphenyl, p,p'-dihydroxydiphenyl ethane, bis(2-hydroxynaphthyl) methane, 1,5-dihydroxynaphthylene and the like with Bisphenol A being preferred. These polyepoxide resins are well known in the art and are made in desired molecular weights be reacting the epihalohydrin and the dihydric phenol in various ratios or by reacting a dihydric phenol with a lower molecular weight polyepoxide resin. Particularly preferred polyepoxide resins are glycidyl polyethers of Bisphenol A having epoxide equivalent weights of about 450 to about 2,000, more typically about 800 to about 1,600 and preferably about 800 to about 1,500.

The polyepoxides used in the practice of this invention will have a relatively high molecular weight, that is, the molecular weight will typically be about 900 to about 4,000, more typically about 1,600 to about 3,200 and preferably about 1,600 to about 2,800.

Another quite useful class of polyepoxides are produced similarly from novolak resins or similar polyphenol resins.

Also suitable are the polyepoxides comprising similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis (4-hydroxycyclohexyl) 2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are nonphenolic and are obtained by the epoxidation of alicyclic olefins. For example, by oxygen and selected method catalysts, by perbenzoic acids, by acetaldehyde monoperacetate, or by peracetic acid. Among such polyepoxides are the epoxy alicyclic ethers and esters which are well known in the art.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711, epoxylated ammomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

The water soluble or water miscible polyols used in the practice of this invention to chain extend epoxy resins include organic polyols containing at least one and preferably two alcohol primary hydroxyls. Mixtures of organic polyols may be used in the practice of this invention, as well as mixtures of organic polyols and primary mono primary alcohols. These organic polyols will have a molecular weight of about 200 to about 3,000 more typically about 300 to about 1,000 and preferably about 400 to about 700.

Water miscible is defined as the ability or tendency of the polyol to mix or blend uniformly with water. By water soluble is similarly meant the ability or tendency of the polyol to blend uniformly with water.

The organic polyols which are used in the practice of this invention are those known in the art, e.g. polyols disclosed in U.S. Pat. No. 4,104,147, the disclosure of which is incorporated by reference.

The water soluble or water miscible polyols which are used to generate the modified epoxy resins of this invention include the aliphatic polyols, the aromatic polyols, alkylene polyols, butadiene polyols, and butadiene acrylonitrile polyols.

Specific examples of the organic polyols used in the practice of this invention include Tone 200 brand polyol manufactured by Union Carbide Corp., Carbowax PG 300 and Carbowax PG 400 brand polyols manufactured by Union Carbide Corp., SynFac 8007 and SynFac 8008 brand polyols manufactured by Milliken Chemical Corp., Spartanburg, S.C., and Hycor HTBN brand polyol manufactured by B. F. Goodrich Chemical Corp., Cleveland, Ohio. A particularly preferred polyol is SynFac 8008 brand.

The modification of the polyepoxide, that is, the chain extension and corresponding increase of molecular weight, is accomplished by mixing sufficient quantities of organic polyol with sufficient quantities of polyepoxide in an organic solvent, such as toluene, xylene, methyl isobutyl ketone or any inert solvent or combination thereof and reacting these products at a sufficient temperature for a sufficient amount of time in a conventional reactor in the presence of a catalyst to completely react the polyepoxide. Typically, the reaction temperature will be about 200° F. to about 350° F., more typically about 250° F. to about 320° F., preferably about 260° F. to about 300° F.

Typically the reaction time is about 120 minutes to about 300 minutes; more typically about 160 minutes to about 260 minutes and preferably about 180 minutes to about 240 minutes.

Typically, about 1.5 to about 3.0 epoxide equivalents of polyepoxide is reacted, more typically about 2.0 to about 2.5, and preferably about 2.0 expoxide equivalents with one equivalent of polyol. Examples of suitable catalysts include benzyl dimethylamine, triethylamine, triphenol phosphine, boron trifluoride, dimethylcyclohexylamine, and dimethylethanolamine or any Lewis acid.

The polyamines used in the practice of this invention are typical of those known in the art to be reactive with epoxides such as the polyamines disclosed in U.S. Pat. No. 4,139,510 the disclosure of which is incorporated by reference.

The polyamines which are reacted with the polyepoxide resins in this invention contain at least 2 amine nitrogen atoms per molecule, at least 3 amine hydrogen atoms per molecule and no other groups which are reactive with epoxide groups. These polyamines can be aliphatic, cycloaliphatic or aromatic and contain at least 2 carbon atoms per molecule. Useful polyamines contain about 2 to about 6 amine nitrogen atoms per molecule, about 3 to about 8 amine hydrogen atoms, and about 2 to about 20 carbon atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine,o,m and p-phenylene diamine, 4,4'methylene dianiline, menthane diamine, 1,4-diaminocyclohexane, methyl-aminopropylamine, and the like. Preferred amines for use in this invention are alkylene polyamines of the formula:

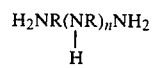

wherein n is an integer of about 0 to about 4 and R is an alkylene group containing about 2 to about 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being triethylene tetramine, tetraethylene pentamine, and diethylene triamine.

Sufficient quantities of polyamine are reacted with sufficient quantities of modified polyepoxide resin so that the adduct formed contains about 1 mole of adducted polyamine molecule for each epoxide equivalent originally present in polyepoxide resin. The adducting reaction typically requires about 1.5 to about 15.0 moles of polyamine, i.e., an excess, for each epoxide equivalent of the polyepoxide resin, more typically about 2.0 moles to about 12.0 moles, and preferably about 3.0 moles to about 10.0 moles. Since excess polyamine is required in the practice of this invention, the excess unreacted polyamine must be removed by distillation after reaction to prevent gellation of the reaction product.

In preparing the modified epoxy-polyamine compositions of this invention sufficient quantities of polyamine are reacted with sufficient quantities of modified polyepoxide resin in a conventional reactor vessel for a sufficient period of time at a sufficient temperature to react all of the epoxide groups. Typically, the reaction temperature will be about 75° F. to about 220° F., more typically about 80° F. to about 190° F., and preferably about 140° F. to about 180° F. The reaction time is typically about five minutes to about 60 minutes, more typically about ten minutes to about 40 minutes and preferably about 25 minutes to about 30 minutes. When the adducting reaction is complete, the unreacted or excess polyamine is removed by distillation with sufficient vacuum and at a sufficient temperature to remove the excess polyamine. Typical distillation temperatures are about 275° F. to about 500° F., more typically 320° F. to about 475° F., and preferably about 425° F. to about 450° F. Typical vacuums are about 60 mmHg to about 76 mmHg, more typically about 65 mmHg to about 76 mmHg and preferably about 74 mmHg to about 76 mmHg.

The monoepoxides used in the practice of this invention contain one 1,2-epoxide group per molecule and about 6 to about 24 carbon atoms per molecule. The monoepoxides used in the practice of this invention are typical of those known in the art such as the monoepoxides disclosed in U.S. Pat. No. 4,139,510 which is incorporated by reference.

Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 8 to 24 carbon atoms, e.g., octylene oxide; decylene oxide, dodecylene oxide and nonadecylene oxide, epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, which is incorporated by reference. Examples of such glycidyl esters are those derived from about 9 to about 19 carbon atoms, particularly Versatic 911 Acid, a product of Shell Oil Company, which acid contains 9 to 11 carbon atoms.

The monoepoxides are reacted with the modified epoxy-polyamine adducts of this invention to improve the electrical insulating properties of the deposited electrodepositable resin compositions of this invention. In addition, these components improve the properties of the deposited coating such as flexibility, corrosion resistance, and hardness.

Sufficient quantities of modified epoxy-polyamine adducts are mixed with sufficient quantities of monoepoxide in an organic solvent such as xylene or toluene, in a conventional reactor vessel for a sufficient period of time at a sufficient temperature to complete the reaction. Typically about one mole of modified epoxy-polyamine adduct is reacted with the following amounts of monoepoxide.

Typically about 0.5 mole to about 2.25 moles of monoepoxide are reacted, more typically about 1.0 mole to about 2.25 moles, preferably about 1.0 mole to about 2.0 moles. The reaction temperature is typically about 150° F. to about 300° F., more typically about 150° F. to about 280° F., and preferably about 150° F. to about 250° F.; reaction times are typically about 60 minutes to about 180 minutes, more typically about 60 minutes to about 150 minutes, and preferably about 60 minutes to about 100 minutes.

Various types of cross-linking agents are used in the electrodepositable coating compositions of this invention. Examples of the types of cross-linking agents which can be included are the aminoplast resins, phenoplast resins and the blocked or capped polyisocyanates. In the practice of this invention it is preferred to use the blocked organic polyisocyanates as cross-linking agents.

The typical aminoplast and phenoplast resins used in the art, as disclosed in U.S. Pat. No. 4,139,510, the disclosure of which is incorporated by reference, can also be used as cross-linking agents in the practice of this invention.

Suitable aminoplast resins are the reaction products of ureas and melamines with aldehydes further etherfied in some cases with an alcohol. Examples of aminoplast resin components are urea, ethylene urea, thiourea, melamine, benzoguanamine and acetoguanamine. Aldehydes useful to form aminoplast resins include formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea-formaldehyde resins, hexamethoxymethyl melamine, methylated polymeric melamine-formaldehyde resins, and butylated polymeric melamine-formaldehyde resins. Aminoplast resins and their method of preparation are described in detail in "Encyclopedia of Polymer Science and Technology", Volume 2, pages 1–19, Interscience Publishers (1965), the disclosure of which is incorporated by reference.

Phenoplast resins are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make the phenolplast resins are phenol, o, m, or p-cresol, 2,4-xylenol, 3,4-xylenol, 2,5-xylenol, cardanol, p-tert-butyl phenol, and the like. Aldehydes useful in this reaction are formaldehyde, acetaldehyde and propionaldehyde. Particularly useful phenolplast resins are polymethylol phenols wherein the phenolic group is etherfied with an alkyl, e.g., methyl or ethyl, group. Phenolplast resins and their methods of preparation are described in detail in "Encyclopedia of Polymer Science and Technology", Volume 10, pages 1–68, Interscience Publishers (1969), the disclosure of which is incorporated by reference.

Sufficient quantities of aminoplast and phenolplast resins are used in the cathodic electrocoat resin compositions to produce sufficient cross-linking of the modified epoxy-polyamine adduct-fatty acid reaction monoepoxide product upon baking or curing. Typically, the amount of aminoplast or phenolplast resin used in the practice of this invention is about 15 wt.% to about 45 wt.% of the total vehicle solids weight, more typically about 15 wt.% to about 40 wt.% and preferably about 20 wt.% to about 40 wt.%.

The preferred cross-linking agents used in the practice of this invention are the organic polyisocyanates and, in particular, the blocked polyisocyanates. The organic polyisocyanates and the blocking agents used in the practice of this invention are typical of those used in the art, e.g., U.S. Pat. No. 4,182,831 the disclosure of which is incorporated by reference.

Useful blocked polyisocyanates are those which are stable in the dispersion systems at ordinary room temperature and which react with the resinous product of this invention at elevated temperatures.

In the preparation of the blocked organic polyisocyanates, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the aromatic compounds such as m-phenylene, p-phenylene, 4,4'-diphenyl, and 1,4-napthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane -4,4'4"-triisocyanate, 1,3,5-triisocyanate benzene and 2,4,6-triisocyanate toluene; and the tetraisocyanates such as 4,4'-diphenyl-dimethyl methane-2,2', 5,5'tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be prepolymer derived from a polyol such as glycols, e.g., ethylene glycol and propylene glycol, as well as other polyols such as glycerol, trimethylolpropane, hexanetriol, pentaerythritol, and the like as well as mono-ethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4,-butylene glycol, 1,3-butylene glycol, 1,6-hexanediol, and their mixtures; glycerol trimehylolethane, trimethylolpropane, 1,2,6-hexanetriol, pentaerythritol, dipentaerylthritol, tripentaerythritol, polypentaerythritol, sorbitol, methyl glucosides, sucrose and the like with alkylene oxides such as ethylene oxide, propylene oxide, their mixtures, and the like.

Preferred polyisocyanates include the reaction product of toluene diisocyanate and trimethylolpropane; additionally, the isocyanurate of hexamethylene diisocyanate.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol.

A preferred blocking agent is monopropyl ether of ethylene glycol. Additional blocking agents include tertiary hydroxyl amines, such as diethylethanolamine and oximes, such as methylethyl ketoxime, acetone oxime and cyclohexanone oxime, and caprolactam. A preferred oxime is methyl-n-amyl ketoxime.

The blocked polyisocyanates are formed by reacting sufficient quantities of blocking agent with sufficient quantities of organic polyisocyanate under reaction conditions conventional in this art such that no free isocyanate groups are present when the reaction has run its course.

Sufficient quantities of blocked polyisocyanate are incorporated into the electrodepositable coating compositions of this invention such that the deposited coating will be completely cured upon baking and there will be no free isocyanate groups remaining. Typically, about 20 wt.% to about 80 wt.% of blocked polyisocyanate is mixed with the modified epoxy resin, more typically about 30 wt.% to about 70 wt.%, preferably about 35 wt.% to about 45 wt.%.

The blocked polyisocyanates are mixed with the modified epoxy-polyamine-monoepoxide reaction products of this invention by adding the blocked polyisocyanates to a reactor containing the modified epoxy-polyamine-monoepoxide composition and mixing the charge for about one-half hour.

When the blocked polyisocyanates are used in the coating compositions of this invention, catalyst may be necessary to facilitate urethane formation. However, when using other cross-linking agents, catalysts are required such as dibutyl tin dilaurate, dibutyl tin oxide, dibutyl tin diacetate, etc. Sufficient quantities of catalyst are used to obtain the desired reaction rate.

In order to solubilize the above-mentioned resin composition, it is necessary to salt the reaction product with a water soluble acid. The acids which can be used include those known in the art such as formic acid, acetic acid, phosphoric acid, lactic acid, hydrochloric acid, etc. Sufficient quantities of the acid are mixed with said resin composition to solubilize or disperse the resin in water. One method in which the salting process is accomplished is by charging said reaction product, an acid, water and surfactants conventional in the art into a reactor vessel, and mixing the reactor charge with a slow speed mixer until the reaction has been completed. In a preferred method, acid, water, etc. are initially added to a reactor vessel, then the resin composition is charged while the components are mixed with a slow speed mixer. Typically, the reaction temperature is about 25° F. to about 150° F., more typically about 100° F. to about 140° F., and preferably about 120° F. The reaction will be typically run for about 15 minutes to about 90 minutes, more typically about 25 minutes to about 80 minutes, and preferably about 60 minutes.

Typically about 0.1 Meq to about 0.8 Meq of acid is used per gram of solid resin, more typically about 0.2 Meq to about 0.7 Meq, preferably about 0.2 Meq to about 0.5 Meq.

Electrodepositable cathodic coating compositions of this invention are used in an electrodeposition process as an aqueous dispersion. Sufficient quantities of the resin composition are used so that the concentration of the resin composition in an aqueous bath will produce a coating on an object of sufficient thickness when processed at a sufficient voltage, time and temperature so that upon baking the coating will have the desired characteristics such as smooth surface, high build, short coating time and low temperature cure. Typically, the concentration in water of the resin compositions of this invention are 10 wt.% to about 40 wt.%, more typically about 10 wt.% to about 30 wt.% and preferably about 15 wt.% to about 25 wt.%.

It should be noted that the cathodic electrodepositable resins are typically shipped by the manufacturer to the user as a salted aqueous dispersion having a concentration of about 20 to about 36 wt.% of solids.

The cathodic electrodepositable coating baths of this invention are formed by mixing the solubilized (i.e., salted) cathodic electrodepositable resin compositions of this invention in concentrate form with water. The electrodeposition bath may contain additional ingredients such as pigments, cosolvents, antioxidants, surfactants, etc., which are typically used in electrodeposition processes known in the art. Pigment compositions may be of any conventional type and are one or more of such pigments as the iron oxides, the lead oxides, strontium chromate, carbon black, titanium dioxide, talc, barium sulphite, barium yellow, cadmium red, chromic green, lead silicate, etc. Sufficient quantities of pigment are used to achieve the appearance characteristics desired such as gloss, reflectance, hue, tint and other desired characteristics. Typically the amount of pigment used is expressed in a ratio of total pigment to total binder. Typically a pigment to binder ratio of about 0.1 to about 0.4 is used in the electrodepositable resin compositions of the present invention, more typically about 0.15 to about 0.35, preferably about 0.2 to about 0.3. Pigment is typically added to the electrodeposition bath in paste form, i.e., predispersed in a composition comprising pigment, amine-containing epoxy resin, and surfactants.

The electrodeposition baths may contain coupling solvents which are water soluble or partially water soluble organic solvents for the resinous vehicles used in the practice of this invention. Examples of such coupling solvents include ethylene glycol, monomethyl ether, ethylene glycol, monoethyl ether, ethylene glycol, monobutylether, diethylene glycol monobutylether, ethanol, isopropanol, n-butenol, etc. Co-solvents used in the practice of this invention are those typically used and known in the art. Sufficient amounts of coupling solvent are used so that a good emulsion resulting in a smooth deposited film is produced. Typically the amount of coupling solvent used will be about 0.5 wt.% to about 10 wt.% of the total weight of the coating bath, more typically about 1.0 wt.% to about 5 wt.%, and preferably about 1.0 wt.% to about 2.0 wt.%.

The electrodeposition process typically takes place in an electrically insulated tank containing an electrically conductive anode which is attached to a direct current source. The size of the tank will depend on the size of the article to be coated. Typically the tank is constructed of stainless steel or mild steel lined with a dielectric coating such as epoxy impregnated fiberglass or polyepoxide. The electrodepositable cathodic resinous coating compositions of this invention are typically used to coat articles such as automobile or truck bodies. The typical size of an electrodeposition bath tank used for this purpose is about 60,000 gallons to about 120,000 gallons capacity.

Typically the article to be coated is connected to the direct current electric circuit so that the conductive object acts as the cathode. When the article is then immersed in the coating bath, flow of electrons from the cathode to the anode, that is, conventional current flow from the anode to the cathode, results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, and the residence time. Sufficient voltage is applied to the coated article for a sufficient time to obtain a coating of sufficient thickness. Typically the voltage applied across the coated article is about 50 volts to about 500 volts, more typically about 200 to about 350 volts, and preferably about 225 volts to about 300 volts. The current density is typically about 0.5 amperes per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film of sufficient thickness having sufficient resistance to corrosion and flexibility. The residence time or holding time is typically about 1 minute to about 3 minutes, more typically about 1 minute to about 2½ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically the pH is about 4 to about 7 more typically about 5 to about 6.8, and preferably about 6 to about 6.5.

The conductivity of the coating bath will be sufficient to produce a coated film of sufficient thickness. Typically the conductivity will be about 800 micro mhos to about 3,000 micro mhos, more typically about 800 micro mhos to about 2,200 micro mhos, and preferably about 900 micro mhos to about 1,800 micro mhos.

The desirable coatings have sufficient thicknesses to provide resistance to corrosion while having adequate flexibility. Typically, the film thicknesses of the coated objects of this invention will be about 0.4 mil to about 1.8 mils, more typically about 0.6 mil to about 1.6 mils, and preferably about 1.2 mils to about 1.4 mils.

The temperature of the coating bath is maintained, typically by cooling, at a temperature less than about 90° F.

When the desired thickness of the coating has been produced, the coated object is removed from the electrodeposition bath and cured. Typically the electrodeposited coatings are cured in a conventional convection oven at a sufficient temperature for a sufficient length of time to cause the cross-linking composition to cross-link the resin. In the case of a blocked polyisocyanate, this would be a sufficient time and temperature to unblock the blocked polyisocyanates and allow for cross-linking of the electrodepositable resin compositions. Typically, the coated articles will be baked at a temperature of about 200° F. to about 600° F., more typically about 225° F. to about 325° F., and preferably about 225° F. to about 290° F. The coated articles will be baked for a time period of about ten minutes to about 40 minutes, more typically about ten minutes to about 35 minutes and preferably about 15 minutes to about 30 minutes.

It is contemplated that the coated articles of the present invention may also be cured by using radiation, vapor curing, contact with heat transfer fluids and equivalent methods.

The smoothness of the cured coating is a function of the "flow" of the deposited coating composition. Flow is defined as the tendency of the electrodeposited coating composition to liquify during the curing operation and form a smooth cohesive film over the surface of a coated article prior to the onset of cross-linking.

Typically the coated articles of this invention will comprise conductive substrates such as metal, including steel, aluminum, copper, etc., however, any conductive substrate having a conductivity similar to the aforementioned metals may be used. The articles to be coated may comprise any shape so long as all surfaces can be wetted by the electrodeposition bath. The characteristics of the article to be coated, which have an effect on the coating, include the shape of the article, the capacity of the surfaces to be wetted by the coating solution, and the degree of shielding from the anode. Shielding is defined as the degree of interference with the electromotive field produced between the cathode and the anode, thereby preventing coating composition from being deposited in those shielded areas. A measure of the ability of the coating bath to coat remote areas of the object is throwpower. Throwpower is a function of the electrical configuration of the anode and cathode as well as the conductivity of the electrodeposition bath.

The coatings of the coated articles of this invention exhibit superior smoothness, gloss, flexibility, durability, and resistance to corrosion. Smoothness and gloss are related to the flow of the electrodeposited cathodic resin. Durability, flexibility and resistance to corrosion are related to the chemical nature of the electrodeposited cathodic resin. These coating compositions readily accept an automotive primer coat.

The coating compositions of the present invention produce "high" build coatings which are deposited in a "short" period of time with a "low" cross-linking temperature in an electrodeposition process.

By "high" build is meant coating thicknesses of about 1.2 mils to about 1.8 mils.

Deposited in a "short" period of time is defined as less than about 2 minutes.

"Low" cross-linking temperature is defined as about 225° F. to about 300° F.

It should be noted that the articles coated by the coating compositions of this invention are typically automobile bodies which have been pretreated to remove impurities in a phosphatizing bath.

The following example is illustrative of the principles and practice of this invention, although not limited thereto. Parts and percentages where used are parts and percentages by weight.

EXAMPLE

A. The following components were charged into a suitable reactor vessel:
879 parts of Epon 828 having an epoxy equivalent weight of 188;
263 parts of Bisphenol A; and
323 parts of ethoxylated Bisphenol A having a hydroxy equivalent weight of 230 (Synfac 8009 from Milliken Chemical Co.).

The charge was heated to 100° C. under a dry nitrogen blanket and one part benzyl dimethyl amine was added to the reactor vessel. The reaction mixture was further heated to 130° C. until the desired WPE was achieved, then 598 parts of toluene were added to the reactor to dilute the resulting adduct A.

B. A conventional reactor equipped with an agitator, thermometer, nitrogen line and a condensor was charged with 1260 parts of diethylene triamine. The diethylene triamine was slowly heated to 140° F. Then, 2063 parts of the adduct A were slowly added to the reactor during a one-hour time period. After the adduct A was completely charged, the mixture was heated to 180° F. and held for one hour. Next, the excess amine in the reactor mixture was vacuum distilled, condensed and removed by applying a vacuum of 75 mmHg and slowly raising the temperature of the reactor charge to 550° F. over a 2.5 hour time period. The mixture was held at this temperature until no more distillate was coming out. The temperature was then lowered to 250° F. and 725 parts of Azepoxy #8 (AZS Co.) were added slowly to the reactor. The resulting mixture was held at 250° F. for 1.5 hours. Then the reaction mixture was cooled down to ambient temperature and reduced to 65% NV with methyl isobutyl ketone.

C. The crosslinker was prepared by slowly charging 870 parts of trimethylopropane into a reactor vessel containing 3387 parts of an 80/20 isomer mixture of 2,4-/2,6-toluene diisocyanate, 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 140° F., at which time 2026 parts of ethylene glycol monopropyl ether were added. The charge was maintained at 210° F. to 220° F. for one and one-half hours until essentially all of the isocyanate moiety was consumed as indicated by infrared scan. The batch was then thinned with 2116 parts of methyl isobutyl ketone.

D. The adduct D and the adduct E are the two intermediates for the grinding vehicle. The adduct D was prepared by charging ethylene glycol monopropyl ether to 2,4-toluene diisocyanate under agitation with a dry nitrogen blanket. The reaction was maintained at a temperature below 100° F. The charge was held an additional one and one-half hours.

E. To 455 parts of Triton X-102 (an alkylaryl polyether alcohol manufactured by Rohm and Haas Co., Philadelphia, PA) and 51 parts of methyl isobutyl ketone previously azeotroped to remove water, 109 parts of 2,4-toluene diisocyanate were added. The reaction was maintained at 115° F. for two hours. To this product, 56 parts of dimethyl ethanol amine was charged, and the reaction was maintained at 160° F. for one hour. Finally, 50 parts of ethylene glycol monobutyl ether, 75 parts of lactic acid, and 89 parts of deionized water were added. The reaction was held at 190° F. for one hour.

F. The grinding vehicle was prepared by charging 88 parts of the adduct D to a reaction vessel containing 206 parts of EPON 1002F (WPE=650, manufactured by Shell Chemical Co., Houston, TX) and 39 parts of isobutyl methyl ketone. The reaction temperature was maintained at 250° F. for one hour. Then, 186 parts of ethylene glycol monobutyl ether and 381 parts of adduct E were added. The batch was maintained at 180° F. for four hours.

G. A pigment paste was prepared by grounding 203 parts of the grinding vehicle F, 17 parts of ethyl glycol monobutyl ether, 274 parts of deionized water, 67 parts of aluminum silicate, 317 parts of $TiO_2$, 30 parts of lead silicate, 6 parts of carbon black, and 19 parts of dibutyl tin oxide in a steel ball mill to 12 microns. Then, 66 parts of additional deionized water was added.

H. The acrylic flow agent was prepared by charging 44 parts of butyl acrylic, 15 parts of hydroethyl acrylic, 15 parts of dimethylaminoethyl methacrylic, 2 parts of styrene, 1 part of octyl mercapton, 4 parts of VAZO 67, and 3 parts of acetone to a refluxing mixture of 13 parts of methyl isobutyl ketone and 2 parts of acetone over a four-hour period. After fifteen minutes holding period, 0.14 parts of VAZO 67 and 1 part of methyl isobutyl ketone were added. The batch was maintained at the refluxing temperature for another hour.

I. The principal emulsion was prepared by adding 324 parts of B, 163 parts of C, 10 parts of H, and 8 parts of propylene glycol monophenyl ether to 140 parts of deionized water and 3.7 parts of acetic acid under high agitation for one hour. An additional 255 parts of deionized water was added. After agitation for three days, organic solvents were driven off.

J. A dispersion suitable for electrodeposition composed of 2212 parts of the principal emulsion I, 1392 parts of deionized water, and 397 parts of the pigment paste G. The dispersion had a pH of 6.3 and a total solid of 25 percent. Zinc phosphated steel panels electrocoated at 300 volts for two minutes gave a smooth film of 1.2 mils to 1.4 mils thickness after a 300° F. bake for 25 minutes. After 672 hours in salt spray, phosphated steel panels showed <0.03 inch creep, and bare steel panels <0.5 inch creep.

Although this invention has been shown and described with respect to the detailed embodiments thereof, it will be understood by those skilled in the art that various changes in form and detail thereof may be made without departing from the spirit and scope of the invention.

We claim:

1. A resin composition particularly adapted for use as a film-forming composition in a cathodic electrodeposition process comprising the reaction product of:
   (I) a modified epoxy resin formed by reacting a polyepoxide with a water miscible or water soluble polyol;
   (II) a polyamine in a ratio equal to at least 1.5 moles of polyamine to each molar equivalent of epoxide; and
   (III) an aliphatic monoepoxide,
wherein the resulting reaction product in combination with a cross-linking agent component is capable of depositing coatings about 1.2 to about 1.8 mils thick in less than about 2 minutes with a cross-linking temperature of about 225° F. to about 300° F. in a cathodic electrodeposition process.

2. The resin composition of claim 1 additionally containing a cross-linking agent.

3. The resin composition of claim 2 wherein the cross-linking agent is a blocked polyisocyanate.

4. The resin composition of claim 3 wherein the blocked polyisocyanate is the reaction product of trimethylol propane, and toluene diisocyanate blocked with methyl-n-amyl ketoxime.

5. The resin of claim 1 wherein the resin composition has a cure temperature of about 290° F. to about 310° F.

6. The resin of claim 1 wherein about 1.5 to about 15.0 moles of polyamine are present for each molar equivalent of epoxide in the amine-epoxy resin reaction product.

7. An aqueous cathodic electrodeposition coating bath comprising water, an acid solubilized amine-epoxy resin reaction product and a cross-linking agent wherein the improvement comprises a resin composition particularly adapted for use as a film forming composition comprising the reaction product of:
   (I) a modified epoxy resin formed by reacting a polyepoxide with a water miscible or water soluble polyol;
   (II) a polyamine in a ratio of at least 1.5 moles of polyamine to each epoxide equivalent; and
   (III) an aliphatic monoepoxide,
wherein the resulting reaction product in combination with a cross-linking agent is capable of depositing coatings about 1.2 to about 1.8 mils thick in less than about 2 minutes with a cross-linking temperature of about 225° F. to about 300° F. in a cathodic electrodeposition process.

8. The aqueous bath of claim 7 wherein the cross-linking agent is a blocked polyisocyanate.

9. The aqueous bath of claim 8 wherein the blocked polyisocyanate is the reaction product of trimethylol propane, and toluene diisocyanate blocked with methyl-n-amyl ketoxime.

10. The aqueous bath of claim 8 wherein the resin composition has a cure temperature of about 290° F. to about 310° F.

11. The aqueous bath of claim 8 wherein about 1.5 to about 15.0 moles of polyamine are present for each molar equivalent of epoxide in the resin composition.

12. A coated article having a cathodic electrodeposited coating wherein a cathodic electrodepositable amine-epoxy resin reaction product is mixed with a cross-linking agent, the resin reaction product with cross-linking agent is then salted with an acid and solubilized in an aqueous bath containing an anode, the conductive article is electrically connected to a direct current electric circuit to act as a cathode, the article is immersed in the bath, and a direct current is passed across the article resulting in the deposition of a film of the resin reaction product and cross-linking agent, and the coated article is then removed from the bath and cured, the improvement comprising the use of a cathodic electrodepositable resin composition comprising a resin composition particularly adapted for use as a film-forming composition in cathodic electrodeposition processes comprising the reaction product of:
   (I) a modified epoxy resin formed by reacting a polyepoxide with a water miscible or water soluble polyol;
   (II) a polyamine in a ratio equal to at least 1.5 moles of polyamine to each epoxide molar equivalent of epoxide; and
   (III) an aliphatic monoepoxide,
wherein the resulting reaction product in combination with a cross-linking agent is capable of depositing coatings about 1.2 to about 1.8 mils thick in less than about 2 minutes with a cross-linking temperature of about 225° F. to about 300° F. in a cathodic electrodeposition process.

13. The coated article of claim 12 wherein the cross-linking agent is a blocked polyisocyanate.

14. The coated article of claim 13 wherein the blocked polyisocyanate comprises the reaction product of trimethylol propane, and toluene diisocyanate blocked with methyl-n-amyl ketoxime.

15. The coated article of claim 12 wherein the resin composition has a cure temperature of about 290° F. to about 310° F.

16. The coated article of claim 12 wherein the resin composition comprises about 1.5 to about 15.0 moles of polyamine for each molar equivalent of epoxide in the resin reaction product.

17. A method of coating articles with a film-forming resin using a cathodic electrodeposition process wherein a cathodic electrodepositable amine-epoxy resin reaction product is mixed with a cross-linking agent, the resin reaction product is then salted with acid and solubilized in an aqueous bath containing an anode, a conductive article is electrically connected to a direct current electric circuit to act as a cathode, the article is immersed in the bath, and a direct electric current is passed across the article resulting in the deposition of a film of the resin reaction product and cross-linking agent, and then the coated article is removed from the bath, the coating is cured, the improvement comprising the use of cathodic electrodepositable resin composition comprising a resin composition particularly adapted for use as a film-forming composition in cathodic electrodeposition processes comprising the reaction product of:

(I) a modified epoxy resin formed by reacting a polyepoxide with a water miscible or water soluble polyol;

(II) a polyamine in a ratio equal to at least 1.5 moles of polyamine to each molar equivalent of epoxide; and (III) an aliphatic monoepoxide, wherein the resulting reaction product in combination with a cross-linking agent is capable of depositing coatings about 1.2 to about 1.8 mils thick in less than about 2 minutes with a cross-linking temperature of about 225° F. to about 300° F. in a cathodic electrodeposition process.

18. A method of preparing a resin composition particularly adapted for use as a film-forming composition in cathodic electrodeposition processes comprising:

(A) reacting
  (I) a modified epoxy resin formed by reacting a polyepoxide with a water miscible or water soluble polyol, and
  (II) a polyamine in a ratio equal to at least 1.5 moles of polyamine to each molar equivalent of epoxide;

(B) vacuum distilling the resulting adduct to remove the unreacted polyamine; and (C) then reacting an aliphatic monoepoxide with the adduct of (A) and (B), wherein the resulting reaction product in combination with a cross-linking agent is capable of depositing coatings about 1.2 to about 1.8 mils thick in less than about 2 minutes with a cross-linking temperature of about 225° F. to about 300° F. in a cathodic electrodeposition process.

* * * * *